United States Patent
Wei et al.

(10) Patent No.: US 12,309,066 B1
(45) Date of Patent: May 20, 2025

(54) SYSTEM AND METHOD FOR INCREASED THROUGHPUT AND SCALABILITY

(71) Applicant: AVIATRIX SYSTEMS, INC., Santa Clara, CA (US)

(72) Inventors: Xiaobo Sherry Wei, Palo Alto, CA (US); Praveen Vannarath, Sunnyvale, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 0 days.

(21) Appl. No.: 17/395,428

(22) Filed: Aug. 5, 2021

Related U.S. Application Data

(60) Provisional application No. 63/152,291, filed on Feb. 22, 2021.

(51) Int. Cl.
*H04L 47/125* (2022.01)
*H04L 47/70* (2022.01)
*H04L 67/1004* (2022.01)

(52) U.S. Cl.
CPC .......... *H04L 47/125* (2013.01); *H04L 47/825* (2013.01); *H04L 67/1004* (2013.01)

(58) Field of Classification Search
CPC .................. H04L 47/125; H04L 47/825; H04L 67/1004
See application file for complete search history.

(56) References Cited

U.S. PATENT DOCUMENTS

| | | | |
|---|---|---|---|
| 7,801,030 B1* | 9/2010 | Aggarwal | H04L 45/121 370/227 |
| 9,813,379 B1* | 11/2017 | Shevade | H04L 45/24 |
| 9,942,787 B1* | 4/2018 | Tillotson | H04W 24/08 |
| 9,985,894 B1* | 5/2018 | Baveja | H04L 47/125 |
| 10,313,225 B1* | 6/2019 | Shevade | H04L 41/0806 |
| 10,355,989 B1* | 7/2019 | Panchal | H04L 45/586 |
| 11,082,258 B1* | 8/2021 | Ganapathy | H04L 45/54 |
| 11,206,207 B1* | 12/2021 | Deb | H04L 45/16 |
| 11,252,126 B1* | 2/2022 | Thunga | H04L 45/48 |
| 11,388,227 B1* | 7/2022 | Sun | H04L 12/4641 |
| 11,502,942 B1* | 11/2022 | Sun | H04L 45/24 |
| 11,552,889 B1* | 1/2023 | Panchal | H04L 67/10 |
| 11,552,930 B2* | 1/2023 | Iqbal | H04L 63/0428 |
| 2012/0250516 A1* | 10/2012 | Aggarwal | H04L 45/22 370/252 |
| 2013/0336164 A1* | 12/2013 | Yang | H04L 47/125 370/255 |

(Continued)

*Primary Examiner* — Jimmy H Tran
(74) *Attorney, Agent, or Firm* — Winstead PC

(57) ABSTRACT

A network architecture including a layered transit virtual private cloud network and interface logic that controls the egress and ingress of messages between the transit VPC and an on-premises network. First, the layered transit VPC includes a first transit gateway cluster communicatively coupled to one or more spoke VPCs for receipt of messages from cloud instances and a second transit gateway cluster communicatively coupled to the on-premises network. The layered transit VPC supports increased scalability for the spoke VPCs. Second, the interface logic is configured to operate in concert with a gateway cluster that controls operability of a router by at least controlling propagation of messages into or from the on-premises network via one or more selected gateways forming the gateway cluster.

9 Claims, 6 Drawing Sheets

(56) References Cited

U.S. PATENT DOCUMENTS

| | | | |
|---|---|---|---|
| 2015/0207724 A1* | 7/2015 | Choudhury | H04L 45/42 370/255 |
| 2016/0080477 A1* | 3/2016 | Nedeltchev | H04L 67/10 709/218 |
| 2016/0127454 A1* | 5/2016 | Maheshwari | H04L 67/10 709/223 |
| 2016/0352682 A1* | 12/2016 | Chang | G06F 9/45558 |
| 2017/0026470 A1* | 1/2017 | Bhargava | H04L 63/0272 |
| 2017/0346657 A1* | 11/2017 | Huynh Van | H04L 9/30 |
| 2018/0034821 A1* | 2/2018 | Basetty | H04L 63/101 |
| 2018/0063193 A1* | 3/2018 | Chandrashekhar | G06F 15/177 |
| 2018/0255142 A1* | 9/2018 | Benantar | H04L 67/562 |
| 2019/0036808 A1* | 1/2019 | Shenoy | H04L 45/64 |
| 2019/0109729 A1* | 4/2019 | De Luca | H04L 45/17 |
| 2019/0166048 A1* | 5/2019 | Srinivasan | H04L 45/745 |
| 2019/0238509 A1* | 8/2019 | Hira | H04L 63/164 |
| 2019/0268421 A1* | 8/2019 | Markuze | H04L 67/10 |
| 2019/0372932 A1* | 12/2019 | Polcha, Sr. | H04L 63/0227 |
| 2020/0021528 A1* | 1/2020 | Sharma | H04L 47/21 |
| 2020/0059492 A1* | 2/2020 | Janakiraman | H04L 12/4641 |
| 2020/0067734 A1* | 2/2020 | Hira | H04L 45/72 |
| 2020/0092138 A1* | 3/2020 | Tillotson | H04L 12/4633 |
| 2020/0092194 A1* | 3/2020 | Tillotson | H04L 12/4633 |
| 2020/0162362 A1* | 5/2020 | Deb | H04L 45/42 |
| 2020/0162383 A1* | 5/2020 | Deb | H04L 67/61 |
| 2020/0162407 A1* | 5/2020 | Tillotson | H04L 43/16 |
| 2020/0252234 A1* | 8/2020 | Ramamoorthi | H04L 45/22 |
| 2020/0304338 A1* | 9/2020 | Skobodzinski | G06F 9/5077 |
| 2020/0382345 A1* | 12/2020 | Zhao | H04L 45/04 |
| 2021/0044512 A1* | 2/2021 | Deb | H04L 45/124 |
| 2021/0044588 A1* | 2/2021 | Strezo | G06F 9/54 |
| 2021/0067375 A1* | 3/2021 | Cidon | H04L 12/4633 |
| 2021/0112034 A1* | 4/2021 | Sundararajan | H04L 41/0893 |
| 2021/0132976 A1* | 5/2021 | Chandrappa | G06F 9/45558 |
| 2021/0135991 A1* | 5/2021 | Dickinson | H04L 12/4641 |
| 2021/0218598 A1* | 7/2021 | Ganapathy | H04L 45/64 |
| 2021/0218664 A1* | 7/2021 | Tillotson | H04L 45/04 |
| 2021/0234835 A1* | 7/2021 | Chen | H04L 67/1001 |
| 2021/0258268 A1* | 8/2021 | Yu | H04L 41/044 |
| 2021/0314192 A1* | 10/2021 | Chandrashekhar | H04L 45/44 |
| 2021/0320817 A1* | 10/2021 | Janakiraman | H04L 12/4633 |
| 2021/0349765 A1* | 11/2021 | Zhou | H04L 63/0236 |
| 2021/0359948 A1* | 11/2021 | Durrani | H04L 45/02 |
| 2022/0006805 A1* | 1/2022 | Kulkarni | H04L 67/1097 |
| 2022/0038311 A1* | 2/2022 | Shen | H04L 12/66 |
| 2022/0046061 A1* | 2/2022 | Janakiraman | H04L 67/10 |
| 2022/0070147 A1* | 3/2022 | Iqbal | H04L 63/0272 |
| 2022/0103471 A1* | 3/2022 | Kulkarni | H04L 12/2863 |
| 2022/0131744 A1* | 4/2022 | Kumar | H04L 67/1097 |
| 2022/0141155 A1* | 5/2022 | Zhang | H04L 67/568 370/216 |
| 2022/0141189 A1* | 5/2022 | Flavel | H04L 63/0272 726/15 |
| 2022/0329461 A1* | 10/2022 | Hira | H04L 12/66 |
| 2023/0079670 A1* | 3/2023 | Deb | H04L 45/46 370/400 |
| 2023/0090171 A1* | 3/2023 | Beyer | G06F 9/5072 718/1 |
| 2023/0097386 A1* | 3/2023 | Kreger-Stickles | H04L 47/18 709/238 |
| 2023/0116163 A1* | 4/2023 | Scholz | H04L 61/2567 370/392 |
| 2023/0179445 A1* | 6/2023 | Cidon | H04L 61/4511 370/254 |
| 2023/0179563 A1* | 6/2023 | Goodwin | H04L 45/68 709/245 |
| 2023/0247027 A1* | 8/2023 | Brar | H04L 63/0272 726/4 |
| 2023/0283549 A1* | 9/2023 | Brar | H04L 45/18 370/390 |
| 2024/0129185 A1* | 4/2024 | Shetye | H04L 67/10 |
| 2024/0380726 A1* | 11/2024 | Ban | H04L 61/5007 |
| 2024/0406027 A1* | 12/2024 | Fray | H04L 12/4633 |

\* cited by examiner

SYSTEM AND METHOD FOR INCREASED THROUGHPUT AND SCALABILITY

CROSS-REFERENCE TO RELATED APPLICATIONS

This application claims the benefit of priority on U.S. Provisional Patent Application No. 63/152,291 filed Feb. 22, 2021, the entire contents of which are incorporated by reference herein.

FIELD

Embodiments of the disclosure relate to the field of networking. More specifically, one embodiment of the disclosure relates to a network architecture configured to support increased gateway scalability and system throughput to mitigate communication disruptions, especially between virtual private clouds (VPCs) within a public cloud network.

GENERAL BACKGROUND

Over the past few years, cloud computing has provided an Infrastructure as a Service (IaaS), where resources are provided as part of a cloud computing platform (e.g., public cloud network) and made accessible to tenants as a service. One of these services allows tenants to run software components (e.g., virtual machines instances such as virtual servers) residing within the cloud computing platform. Hence, the migration of software functionality into cloud computing platforms has led to greater usage of virtual private cloud networks (VPCs).

A virtual private cloud network (VPC) is an on-demand, configurable pool of shared resources, which are allocated within the cloud computing platform and provide a certain level of isolation between the different organizations or other entities (hereinafter, "users") using the resources. The isolation between one VPC user from other users of the same cloud computing platform may be achieved through allocation of a private Internet Protocol (IP) subnetwork on a per user basis. For example, Amazon® Web Services (AWS®) provides for the purchase of Amazon® Elastic Compute Cloud (EC2) services with dedicated data processing capabilities for a particular user while Microsoft® Azure® provides different types of virtual machines.

Currently, certain cloud computing platforms provide connectivity between VPCs. This connectivity, sometimes referred to as "peering," constitutes an establishment of private IP-based, peer-to-peer communications between resources within separate VPCs for the purpose of routing data traffic as requested. Conventionally, these private peer-to-peer communications include a primary communication link and a high availability (HA) communication link. The HA communication link was operational in response to a "failover" condition.

Recently, for increased system throughout, the above-described private IP-based, peer-to-peer communications are now utilizing multiple, active communication links. As an illustrative example, each gateway included in a private "spoke" VPC (i.e., a private VPC responsible for maintaining a subnet of application instances operating within the cloud network) is configured to support two private IP-based communication links to a pair of gateways that support routing to a destination VPC or a computing device located in an on-premises network (hereinafter, "transit VPC"). However, this network architecture is subject to operational constraints.

A first operational constraint is that the cloud computing platform, based on current cloud network provider policies, only allows for a limited number of Private IP-based communication links between VPCs (e.g., 100 private IP communication links). Therefore, a traffic bottleneck is created as more data traffic flows through the transit VPC. Without any changes to the cloud network provider policies, which are not controlled by the cloud customer, these bottleneck conditions will continue and become more problematic as more resources are migrated to the cloud and no additional Private IP-based communications links are made available.

A second operational constraint is realized because, due to data traffic management complexities, each gateway included in a private spoke VPC is configured to only support two private IP-based communication links that are directed to a pair of neighboring gateways. An architecture design change in needed to reduce management complexity to allow for a greater number of gateways operating within the same VPC.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
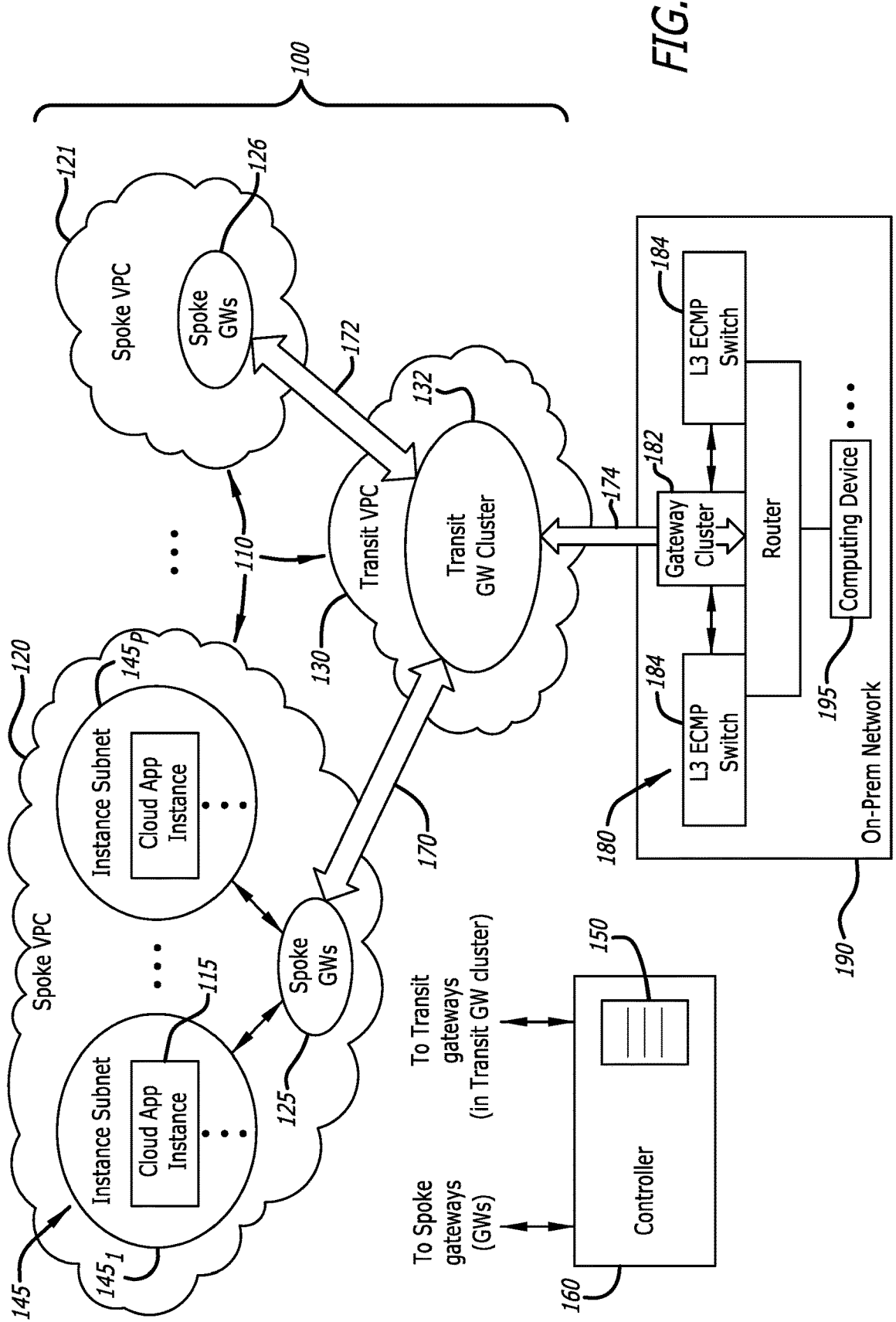
FIG. 1 is an exemplary embodiment of a private cloud computing platform implemented as a load-balanced, full-mesh network featuring multiple virtual private cloud networks (VPCs) including gateway clusters collectively supporting communications between a cloud application instance operating within a private cloud network and an application instance operating within an on-premises network.

Embodiments of a system and method for establishing a load-balanced, full-mesh network architecture for supporting increased gateway scalability and increased system throughput between resources within a single cloud network, resources within a multiple cloud network, or resources within a virtual private cloud network (VPC) and an on-premises ("on-prem") network. This network architecture may feature (i) a plurality of cloud-based networking infrastructures each operating as a virtual private cloud network (hereinafter, "spoke VPC"), (ii) a cloud-based networking infrastructure operating as a private cloud network that supports the routing of messages from/to the spoke VPCs (hereinafter, "transit VPC"), and/or (iii) a local networking infrastructure that supports the routing of messages within an on-prem network.

According to one embodiment of the disclosure, to support increased scalability and system throughout, the transit VPC may feature a gateway cluster including multiple (two or more) gateway pairs. According to another embodiment of the disclosure, to achieve overall increased scalability and system throughout, the transit VPC may be configured with a layered gateway cluster configuration. According to yet another embodiment of the disclosure, to achieve overall increased scalability and system throughout, interface logic associated with an on-prem network may be configured with a gateway cluster and Equal-Cost Multi-Path controlled (ECMP-controlled) switching. These embodiments may be provided separately or components of one embodiment may be utilized in another embodiment, as these illustrated embodiments are not intended to limit the invention to the specific embodiments shown and described.

Herein, as described below, a spoke VPC includes a set (e.g., two or more) gateways (hereinafter, "spoke gateways"), which are communicatively coupled to one or more cloud application instances with a particular subnet or particular subnets. The transit VPC includes a cluster (e.g., four or more) of gateways (hereinafter, "transit gateways"), which control the routing of messages from/to the cloud application instances. As shown, each of the spoke gateways and transit gateways may be accessed in accordance with a unique Classless Inter-Domain Routing (CIDR) routing address to propagate messages over the system.

Besides communicatively coupled to the set of spoke gateways, the set of transit gateways may be communicatively coupled to one or more computing devices deployed within an on-prem network (hereinafter, "on-prem computing devices"). Herein, the transit VPC is configured to control the propagation of data traffic between a cloud application instance of a spoke VPC and a computing device of the on-prem network. In particular, the transit VPC may feature (i) a gateway cluster with multiple gateway pairs or (ii) a layered gateway cluster configuration, which includes multiple gateway clusters each communicatively coupled to a spoke VPC along with another gateway clyster. The transit VPC may be further configured to communicate with interface logic of the on-prem network, where the interface logic may include a gateway cluster and ECMP-controlled switches that control the ingress propagation of messages to and the egress propagation of messages from a router of the on-prem network.

According to one embodiment of the disclosure, a first type of cloud-based networking infrastructure supports a one-to-many communication link deployment (e.g., criss-cross peering), where each spoke gateway supports multiple, active peer-to-peer communication links to different transit gateways. According to one embodiment of the disclosure, the peer-to-peer communication links may constitute cryptographically secure tunnels, such as tunnels operating in accordance with a secure network protocol. One example of a secure network protocol may include, but is not limited or restricted to Internet Protocol Security (IPSec). Hence, for clarity sake, these peer-to-peer communication links may be referred to as "IPSec tunnels." Similarly, a second type of cloud-based networking infrastructure may be configured to operate as a private cloud network that supports the routing of messages between the transit VPC and one or more spoke VPCs while a local networking infrastructure may be configured to support the routing of messages within the on-prem network.

To achieve load-balancing, all of the IPSec tunnels directed to the transit gateways are set to identical, equal cost multi-path (ECMP) routing parameters, namely identical routing weights and ECMP metrics as described below. In particular, the routing path selection via the gateways within the VPCs may be accomplished through the ECMP routing strategy, namely next-hop message forwarding to a single destination can occur over multiple "best" paths that are determined in accordance with an assigned ECMP metric. Hence, for load balancing, the IPSec tunnels associated with a gateway (e.g., spoke gateway or transit gateway) may be assigned equivalent ECMP metrics, where the ECMP metrics may be re-adjusted based on traffic load that exceeds a prescribed threshold. Alternatively, according to another embodiment of the disclosure, loading balancing may not be based on ECMP; rather, load balancing is achieved through an assignment of weights such that different tunnels may be assigned with different weights, based on one or a combination of factors such as bandwidth, preference, or the like. For ease of description, the system deploying ECMP routing is described.

Herein, when an IPSec tunnel fails, the gateway that relies on the IPSec tunnel may update its gateway routing table autonomously by disabling (bring down) a tunnel interface (e.g., virtual tunnel interface) corresponding to the failed IPSec tunnel without reliance on activity by a controller that manages operability of the network. As a result, the gateway precludes messages from being routed through the failed IPSec tunnel to mitigate data transmission loss. Instead, the messages are routed through a selected active IPSec tunnel, which may be reassigned to communicate with all or some of the instances within a particular instance subnet. In response to the IPSec tunnel becoming operational (i.e., the IPSec tunnel goes up), the gateway will bring up the corresponding tunnel interface and recover the routing path if removed from the gateway routing table (e.g., routing path removed when all of the IPSec tunnels to a particular destination becoming disabled).

Besides the network architecture per se, a controller is responsible for managing operability of the private cloud network, including handling the configuration of one or more spoke VPCs by segregating cloud instances within each spoke VPC to particular subnets. A "subnet" is a segment of a VPC's IP address range designated to group resources (e.g., managed software instances each directed to particular functionality) based on security and operational needs. Hence, each instance subnet established within a spoke VPC may be a collection of instances for that spoke VPC that are selected to communicate with a selected spoke gateway residing in the spoke VPC.

The controller may be configured to update gateway routing tables associated with each gateway along with VPC information (e.g., VPC subnet allocations, VPC routing tables and their association with subnets). A VPC routing table is associated with each spoke gateway and is used to establish one or more communication links (e.g., logical connections) between a certain spoke gateway and cloud instances associated with a particular instance subnet. Besides the VPC routing tables for each of the spoke gateways, the controller may be adapted to configure gateway routing tables for each of the gateways within the VPCs. More specifically, according to one embodiment of the disclosure, the controller may be configured to initially program gateway routing tables for both spoke gateways residing within the spoke VPC(s) and transit gateways residing within the transit VPC(s). The gateway routing tables are relied upon by the gateways for determining which tunnels to use for propagating data traffic (e.g., messages) towards a destination (e.g., virtual tunnel interface for a destination cloud instance or computing device).

For this embodiment of the disclosure, the gateway routing tables includes at least IPSec tunnels and perhaps secondary (e.g., GRE) tunnels between gateways within the same VPC to be used in the event that all of the IPSec tunnels have failed.

End to end load balance is achieved through the network architecture by using of two techniques at different stages. Firstly, from VPC instances to spoke gateway, each VPC instance is under a routing subnet. The subnet is associated with a routing table. The routing table forwards data traffic from the instance to a spoke gateway. Traffic from difference source instances of different subnet (routing table) are sent to different spoke gateways. Secondly, between spoke gateway and transit gateway, or transit gateway to on-prem routers, this may be based on analytics conducted on a 5-tuple of a message (e.g., source IP address; source port; destination IP address; destination port; transmission protocol), which is routed from between the spoke gateway and transit gateway or between the transit gateway and on-prem router. The analytics may constitute a one-way hash operation in which the results (or a portion of the results) are used to select a particular ECMP link in the routing table to transmit of the data traffic. The network architecture is selected to provide greater system throughput, especially by reconfiguration of the transit gateway cluster.

Further details of the logic associated with one embodiment of the scalable network system architecture are described below.

I. Terminology

In the following description, certain terminology is used to describe features of the invention. In certain situations, the terms "logic" and "computing device" is representative of hardware, software or a combination thereof, which is configured to perform one or more functions. As hardware, the logic (or computing device) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic (or computing device) may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As software, the logic may operate as firmware stored in persistent storage.

Instance Subnets: Multiple instance subnets may be generated in a spoke VPC so that instances forming a particular instance subnet are forwarded to a selected spoke gateway.

VPC routing table(s): A VPC routing table may be used to associate spoke gateways within each VPC with one or more different instance subnets. Load balancing is achieved by assigning equal cost multi-path (ECMP) routing parameters to each of the gateways. Therefore, the VPC routable table requires no programming unless the gateway becomes disabled (i.e., goes down), where the VPC routing table may be remapped based on the results of a 5-tuple analytics mapped to the remainder of the active gateways within the VPC.

Gateway: This term may be construed as a virtual or physical logic. For instance, as an illustrative example, a gateway may correspond to virtual logic in the form of a software component, such as a virtual machine (VM)-based data routing component for example, which is assigned a Private IP address within an IP address range associated with a VPC including the gateway. Multiple gateways are deployed in a VPC that control the flow of messages from instances of the VPC to one or more remote sites including computing devices that may process data received from the instances. Having similar architectures, each gateway may be identified differently based on its location/operability within a public cloud network platform. For example, a "spoke" gateway may be configured to interact with targeted instances while "transit" gateways may be configured to further assist in the propagation of data traffic (e.g., one or more messages) between different spoke gateways or between directed to a spoke gateway within a spoke VPC or a computing device within an on-prem network. Hence, the gateways allow Cloud Service Providers (CSPs) and enterprises to enable datacenter and cloud network traffic routing between virtual and physical networks, including a public network (e.g., Internet). Alternatively, in some embodiments, a gateway may correspond to physical logic, such as an electronic device that is communicatively coupled to the network and assigned the hardware (MAC) address and IP address.

IPSec tunnels: Secure peer-to-peer communication links established between gateways of neighboring VPCs or between gateways of a VPC and a router of an on-prem network. The peer-to-peer communication links are secured through a secure network protocol suite referred to as "Internet Protocol Security" (IPSec). With respect to the full-mesh network deployment, as an illustrative example, where a spoke VPC has "M" gateways and a neighboring (transit) VPC has N gateways, M×N IPSec tunnels are created between the spoke VPC and the transit VPC to form the full-mesh network. These IPSec tunnels are represented in gateways by virtual tunnel interface (VTI) and the tunnel states are represented by VTI states.

Gateway routing: In a gateway routing table, routing paths between the gateway and an IP addressable destination to which the tunnel terminates (e.g., another gateway, on-prem computing device, etc.), identified by a virtual tunnel interface (VTI) for example, are programmed with ECMP routing parameters, namely identical routing weights and ECMP metrics. Given consistent ECMP metrics are assigned to the IPSec tunnels, the selected routing path towards the remote network may be based on analytics conducted on certain information associated with data traffic (e.g., 5-tuple). These analytics may include conducting a one-way hash operation on the 5-tuple information where a portion of the hash value may be used to identify the selected IPSec tunnel. If any of the IPSec tunnels state is changed or disabled (or re-activated), the corresponding VTI may be removed (or added) from consideration as to termination points for the selected routing path.

Computerized: This term generally represents that any corresponding operations are conducted by hardware in combination with software.

Cloud-based networking infrastructure: This term generally refers to a combination of software instances generated based on execution of certain software by hardware associated with the public cloud network. Each software instance may constitute a virtual network resource associated with the public cloud network, such as a switch, server or the like.

Message: Information in a prescribed format and transmitted in accordance with a suitable delivery protocol. Hence, each message may be in the form of one or more packets, frames, or any other series of bits having the prescribed format.

Transmission medium: A physical or logical communication path between two or more electronic devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General System Architecture

Figure 3:
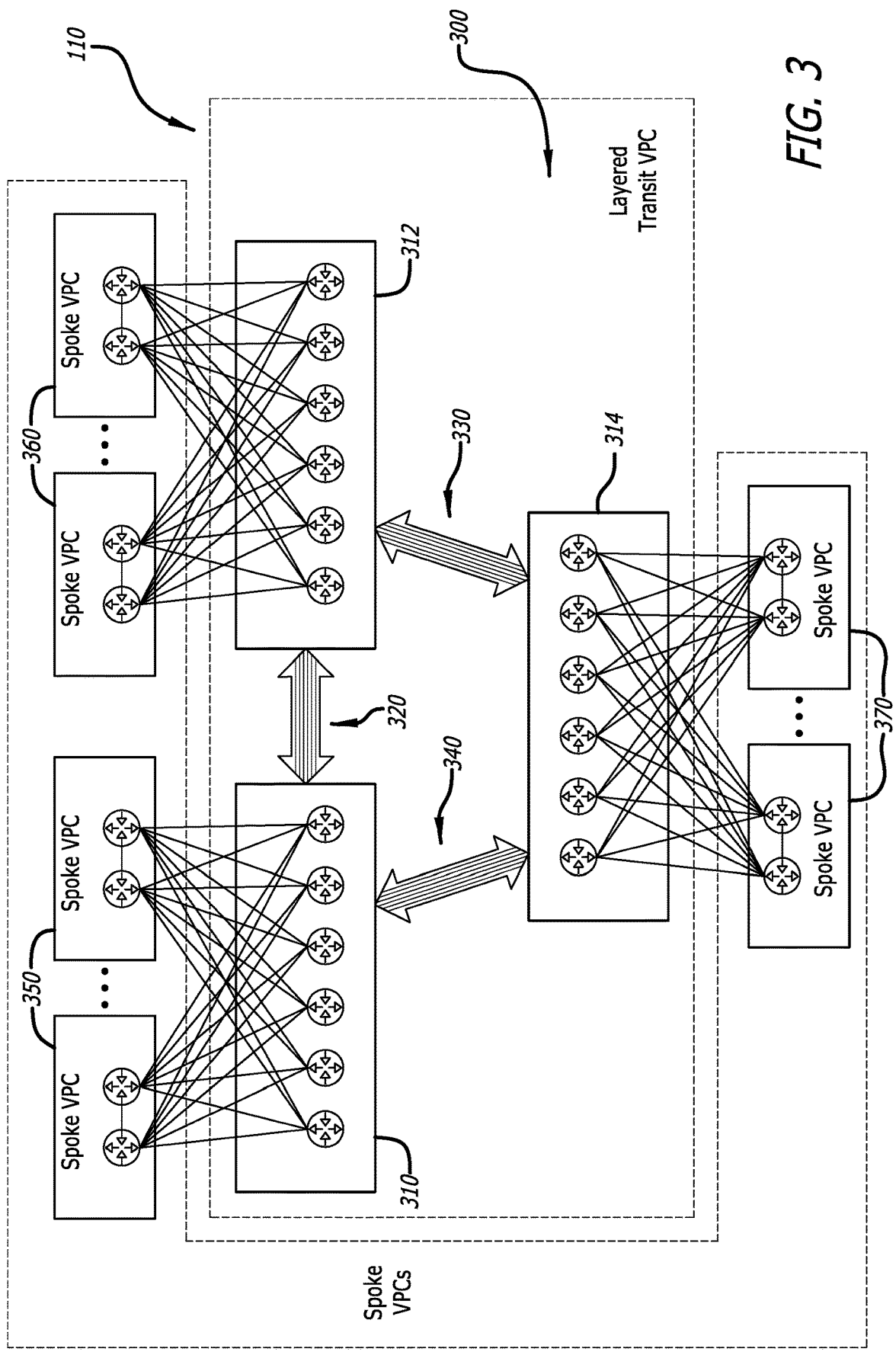
FIG. 3 is an exemplary embodiment of a layered transit VPC to support increased scalability of spoke VPCs.

Referring to FIG. 1, a first exemplary embodiment of a public cloud computing platform 100 implemented with a scalable network 110, which supports reliable communications between one or more cloud application instances 115 of a virtual private cloud network (VPC) 120 and one or more computing devices 195 deployed within an on-prem network 190, is shown. According to this embodiment of the disclosure, the scalable network 110 is configured to provide enhanced throughout between at least a first VPC (hereinafter, "spoke VPC") 120 and a second VPC (hereinafter, "transit VPC") 130 within the public cloud computing platform 100. Although two spoke VPCs 120 and 121 and one transit VPC 130 are illustrated in FIG. 1, it is contemplated that multiple spoke VPCs and multiple transit VPCs may formulate the construct of the scalable network 110 as shown in FIG. 3.

Referring still to FIG. 1, the spoke VPC 120 is configured with multiple VPC subnetworks 145 (hereinafter, "subnets"), where each of these subnets 145 includes different cloud application instances. Each of the instance subnets $145_1 \ldots$, or $145_P$ (P≥2) is configured, in accordance with a VPC routing table 150, to exchange data traffic with a selected gateway of a set of (e.g., two or more) gateways 125 maintained in the spoke VPC 120. Herein, these gateways 125 are referred to as "spoke gateways" 125. The spoke VPC 121 may be deployed in a similar configuration with spoke gateways 126.

More specifically, a controller 160 for the scalable network 110 may be configured to manage communication links between the instance subnets $145_1$-$145_P$ and the set of spoke gateways 125 as represented by the VPC routing table 150, which is initially programmed to identify which of the spoke gateways 125 is responsible for interacting with which of the one or more instance subnets $145_1 \ldots$, or $145_P$ (e.g., to receive message(s), forward message(s), etc.). The same operability described for spoke VPC 120 also applies for spoke VPC 121.

Referring still to FIG. 1, according to one embodiment of the disclosure, the scalable network 110 may be accomplished by peering the set of spoke gateways 125, deployed within the spoke VPC 120, to a gateway cluster 132 deployed within the transit VPC 130 via peer-to-peer communication links 170. As shown in more detail in FIG. 2, according to this embodiment, the gateway cluster 132 includes at least two pairs of transit gateways. Similarly, the set of spoke gateways 126 deployed within the spoke VPC 121 may be communicatively coupled via peer-peer communication links 172 to the transit gateways of the gateway cluster 132.

The transit gateway cluster 132 of the transit VPC 130 may be communicatively coupled, via peer-to-peer communication links 174, to interface logic 180 of the on-prem network 190. The interface logic 180 features a gateway cluster 182 along with Equal-Cost Multi-Path controlled (ECMP-controlled) switching logic 184, which constitute logic that overlays a router (not shown) and controls connectivity between the on-prem network 190 and the transit VPC 130. The switching logic 184 controls selection of one of the gateways within the gateway cluster 182 to assist in the handling of ingress and/or egress communications between a cloud appliance instance deployed within one of the instance subnets 145 and the computing device 195.

Figure 2:
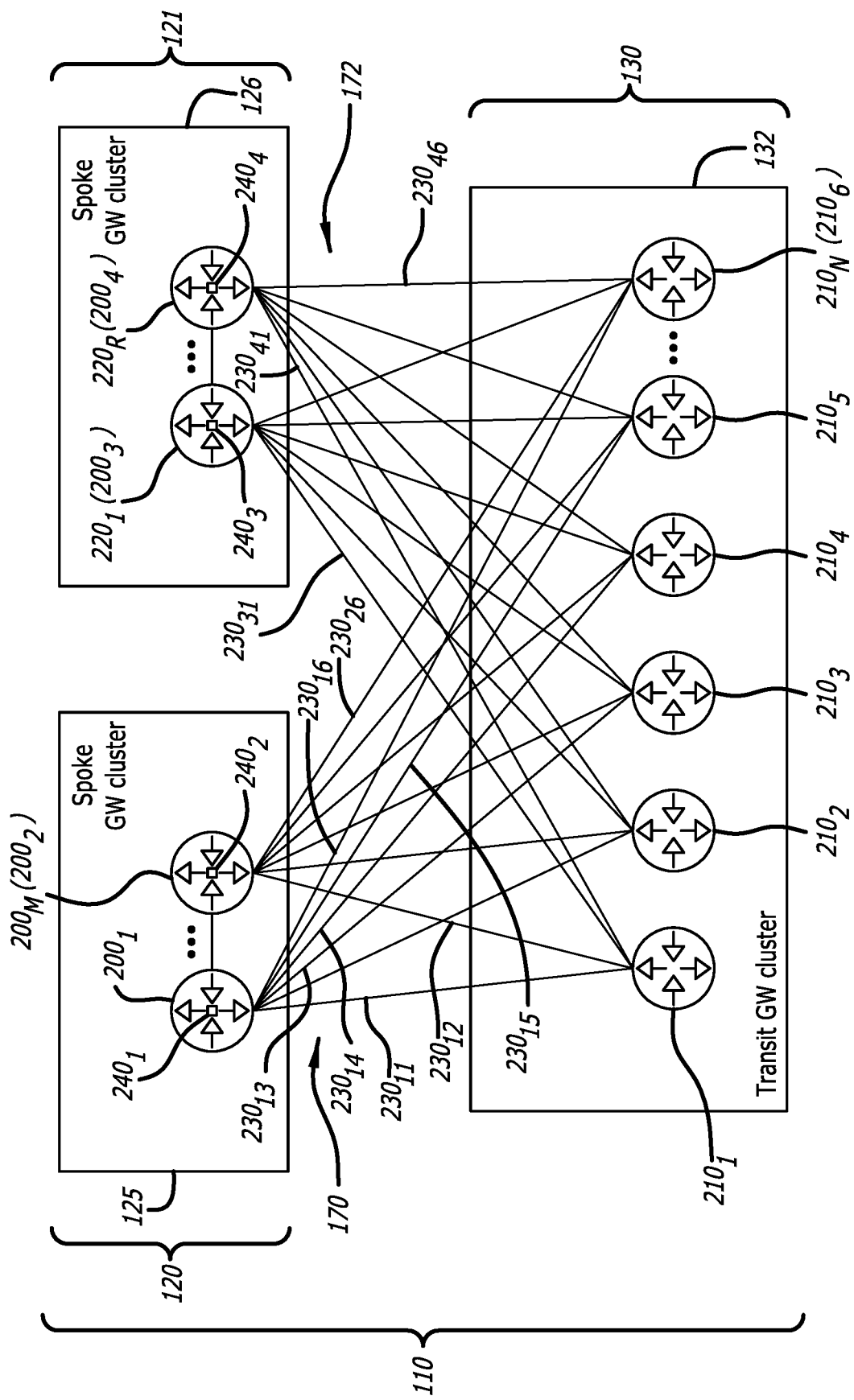
FIG. 2 is an exemplary embodiment of private IP-based, peer-to-peer communications between gateway clusters deployed within multiple spoke VPCs and a gateway cluster deployed within the transit VPC.

Referring now to FIG. 2, according to one embodiment of the disclosure, the scalable network 110 may be accomplished by peering the spoke gateways 125 deployed within the spoke VPC 120 to the transit gateway cluster 132 deployed within the transit VPC 130. More specifically, according to one embodiment of the disclosure, the spoke gateways 125 may include a set (e.g., two or more) of spoke gateways $200_1$-$200_M$ (M≥2) deployed within the spoke VPC 120. The transit gateway cluster 132 includes at least two pairs of "transit gateways" $210_1$-$210_N$ (N≥4) communicatively coupled via the peer-to-peer communications 170 to the spoke gateways $200_1$-$200_M$. Similarly, the spoke gateways 126 may include a set of spoke gateways $220_1$-$220_R$ (R≥2) deployed within the spoke VPC 121, which are communicatively coupled via the peer-peer communication links 172 to the transit gateways $210_1$-$210_N$ of the transit gateway cluster 132.

For ease of illustration, the sets of spoke gateways $200_1$-$200_M$ and spoke gateways $220_1$-$220_R$ are represented as first and second spoke gateways $200_1$-$200_2$ and third and fourth spoke gateways $200_3$-$200_4$, although three or more spoke gateways may be deployed as the spoke gateways 125 and/or spoke gateways 126. Similarly, the transit gateways $210_1$-$210_N$ are represented by a total of six transit gateways $210_1$-$210_6$, although it is contemplated that four or more transit gateways may be deployed as the transit gateway cluster 132 to provide additional throughput for communications from/to the spoke VPCs 120 and 121.

Referring still to FIG. 2, the spoke gateways $200_1$-$200_4$ are configured for communications with transit gateways $210_1$-$210_6$ via the peer-to-peer communication links 170, namely peer-to-peer communication links $230_{11}$-$230_{46}$. In particular, each spoke gateway (e.g., spoke gateway $200_i$, where 1≤i≤4) is communicatively coupled to each of the transit gateways $210_1$-$210_6$ via multiple, active peer-to-peer communication links $230_{11}$-$230_{16}$. Similarly, each transit gateway 210 (e.g., transit gateway $210_1$) is communicatively coupled to each of the spoke gateways $200_1$-$200_4$ via multiple, active peer-to-peer communication links $230_{11}$-$230_{41}$. The peer-to-peer communication links $230_{11}$-$230_{46}$ may constitute cryptographically secure tunnels, such as tunnels operating in accordance with a secure network protocol. One example of a secure network protocol may include, but is not limited or restricted to Internet Protocol Security (IPSec). Hence, the peer-to-peer communication links $230_{11}$-$230_{46}$ may be referred to as "IPSec tunnels $230_{11}$-$230_{46}$."

In general terms, for the scalable network 110 that features the spoke VPC 120 including "M" spoke gateways and the neighboring transit VPC 130 including "N" transit gateways, M×N IPSec tunnels $230_{11}$-$230_{MN}$ (e.g., $230_{11}$-$230_{26}$ as shown) are created between the spoke VPC 120 and the transit VPC 130. The IPSec tunnels $230_{11}$-$230_{26}$ may be established and maintained through gateway routing tables $240_1$-$240_2$ dedicated to each of the spoke gateways $200_1$-$200_2$, respectively. For example, a first gateway routing table $240_1$ determines which IPSec tunnel $230_{11}$-$230_{12}$ for use in forwarding a message from one of the cloud application instances assigned to the first gateway $200_1$ to a destination instance (not shown) reachable via the on-prem computing device 195.

In summary, as shown specifically in FIG. 2 with two illustrated spoke gateways $200_1$-$200_2$ and six transit gateways $210_1$-$210_6$, the first spoke gateway $200_1$ is communicatively coupled to all of the transit gateways $210_1$-$210_6$, such as the first transit gateway $210_1$ via IPSec tunnel $230_{11}$ as well as the second-sixth transit gateways $210_2$-$210_6$ via IPSec tunnel $230_{12}$-$210_{16}$. Similarly, the second spoke gateway $200_2$ is communicatively coupled to both the first transit gateway $210_1$ via IPSec tunnel $230_{21}$ as the second-sixth transit gateways $210_2$-$210_6$ via IPSec tunnel $230_{22}$-$210_{26}$. For this architecture, each spoke gateway $200_1$ and $200_2$ is communicatively coupled to each of the transit gateways $210_1$-$210_6$ via multiple, active peer-to-peer communication links $230_{11}$-$210_{16}$ and $230_{21}$-$210_{26}$, respectively The management of the IPSec tunnels $230_{11}$-$230_{16}$ and $230_{21}$-$230_{26}$ may be accomplished through gateway routing tables $240_1$-$240_2$ maintained by each of the respective gateways $200_1$-$200_2$. The same connective architecture is applicable between the spoke gateways $200_3$-$200_4$ and transit gateways $210_1$-$210_6$.

Although not shown, each transit gateway $210_j$ ($1 \le j \le N$) may be configured to support multiple active peer-to-peer communication links with gateways with the gateway cluster 182 of the on-prem network 190. Hence, where the transit VPC 130 includes "N" transit gateways $210_1$-$210_N$ in communications with a plurality of on-prem gateways, multiple IPSec tunnels (e.g., N×# on-prem gateways) may be created between the transit VPC 130 and the on-prem network 190. Similarly, the IPSec tunnels may be established and maintained through transit gateway routing tables dedicated to each of the transit gateways $210_1$-$210_N$.

Referring to FIG. 3, an exemplary embodiment of the transit VPC 130 configured as a layered transit VPC 300 to support increased scalability for spoke VPCs and increased throughput is shown. Herein, the layered transit VPC 300 is configured in accordance with a mesh network configuration in which each of the transit gateway clusters 310, 312 and 314 reserves a portion of the private peer-to-peer communication links available to them from the cloud provider.

In particular, the layered transit VPC 300 includes a first communication path 320 between the first transit gateway cluster 310 and the second transit gateway cluster 310, a second communication path 330 between the second transit gateway cluster 312 and the third transit gateway cluster 314, and a third communication path 340 between the first transit gateway cluster 310 and the third transit gateway cluster 314. The communication paths 320, 330 and 340 are formed with a portion of the private, peer-to-peer communication links reserved for the scalable network 110.

Stated differently, based on the architecture of an underlying public cloud network, the scalable network 110 is assigned a predetermined number (A) of private, peer-to-peer communication links for use by transit gateway clusters 310, 312 and 314. If the communication links were used in their entirety for communications with spoke gateways, a transit VPC cluster including "B" transit gateways would support "C" spoke gateways ($C \le A/B$). However, for a layered transit VPC 300, a prescribed number of these "A" peer-to-peer communication links are reserved for inter-communications between the transit gateway clusters 310, 312 and 314 over communication paths 320, 330 and 340.

Each of the transit gateway clusters 310, 312 and 314 is responsible for a different (and mutually exclusive) set of spoke gateways 350, 360 and 370, respectively. As shown in FIG. 3, the transit gateway cluster 310 supports communications with the first set of spoke gateways 350, which includes a first plurality of spoke gateways $200_1$-$200_2$ and a second plurality of spoke gateways $200_3$-$200_4$. Similarly, the transit gateway cluster 312 supports communications with the second set of spoke gateways 360 and the transit gateway 314 supports communications with the third set of spoke gateways 370. The communication paths 320, 330 and 340 provides a layered transit gateway data flow for messages exchanged between cloud appliance instances in the same spoke VPC or different spoke VPCs.

Figure 4:
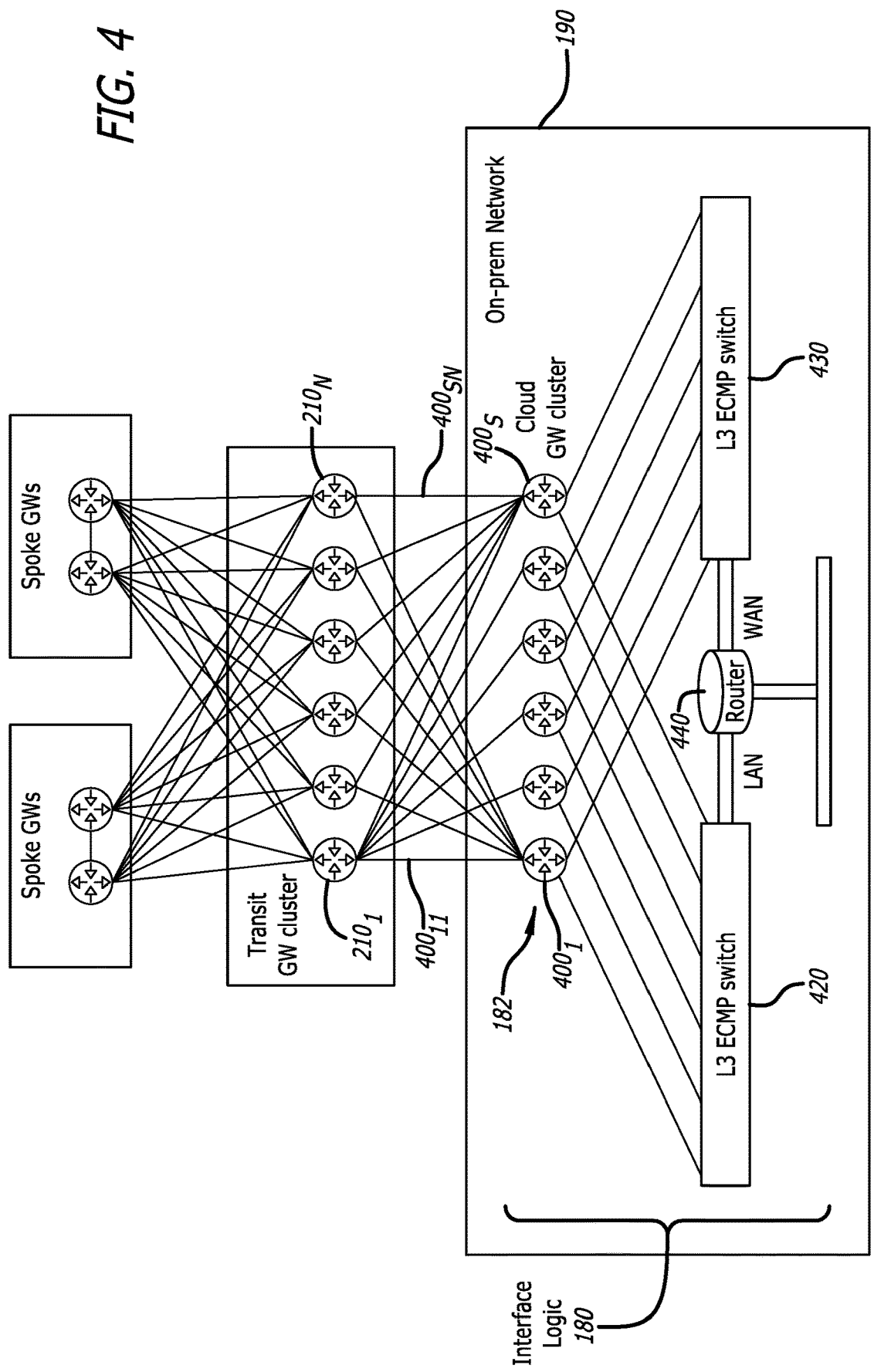
FIG. 4 is an exemplary embodiment of interface logic deployed within an on-premises network to overlay operability of a physical router controlling communications with the on-premises network.

Referring now to FIG. 4, an exemplary embodiment of the interface logic 180 deployed within the on-premises network 190 and overlaying operability of a physical router controlling communications with the on-premises network 190 is shown. Herein, as generally shown in FIG. 1, the interface logic 180 features the gateway cluster 182 along with Equal-Cost Multi-Path controlled (ECMP-controlled) switching logic 184. The gateway cluster 182 features a plurality of gateways $400_1$-$400_S$ ($S \ge 2$), each gateway $400_i$ ($1 \le i \le S$) supporting active, peer-to-peer communications links $410_{i1}$-$410_{iN}$ with each of the transit gateways $210_1$-$210_N$.

The switching logic 184 controls selection of one of the gateways $400_1$ ... or $400_S$ within the gateway cluster 182 to assist in the handling of ingress and/or egress communications involving the computing device 195 of the on-prem network 190. The switching logic 184 comprises a first network ECMP-controlled switch 420 and a second ECMP-controlled switch 430 in communication with the router 440. Herein, the first network ECMP-controlled switch 420 supports ECMP-based selection of one of the gateways $400_1$ ... or $400_S$ for egress data traffic from the computing device 195 while the second network ECMP-controlled switch 430 supports ECMP-based selection of one of the gateways $400_1$ ... or $400_S$ for ingress data traffic directed to the computing device 195. Hence, from a logical perspective, the first network ECMP-controlled switch 420 supports the initial local area network (LAN) centric communications while the second network ECMP-controlled switch 430 supports the initial wide area network (WAN) centric communications as shown in FIG. 4.

III. Operational Flow

Figure 5:
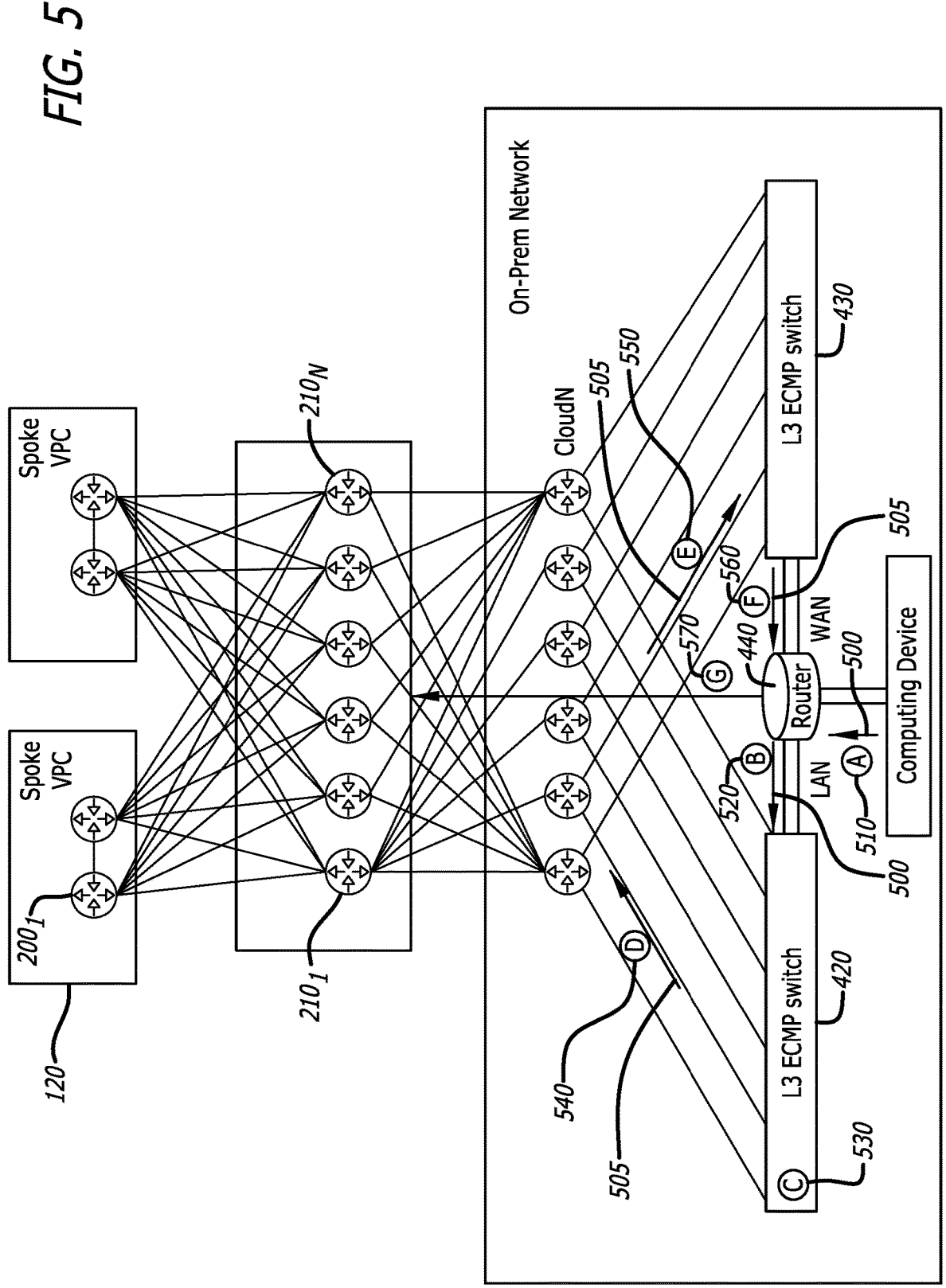
FIG. 5 is an exemplary embodiment of egress operability of the on-premises interface logic of FIG. 4.

Referring to FIG. 5, an exemplary embodiment of egress operability of the on-premises interface logic of FIG. 4 is shown. As shown, the interface logic 180 features the gateway cluster 182 along with the first ECMP-controlled switch 420 and the second ECMP-controlled switch 430 operating with the router 440.

Herein, egress communications 500, such as a message from computing device 195 for example, is received by the router 440 (operation A 510). In response, the router 440 forwards the message 500 to the first ECMP-controlled switch 420 (operation B 520). The first ECMP-controlled switch 420 performs ECMP-based computations on the metrics associated with each the gateways $400_1$-$400_S$ within the gateway cluster to select one of the gateways $400_1$ . . . or $400_S$. Also, as an operational feature, the first ECMP-controlled switch 420 encrypts the message 500 to generate an encrypted message 505 to provide to the selected gateway such as gateway $400_2$ for example (operation C 530). Thereafter, the first ECMP-controlled switch 420 forwards the encrypted message 505 to the selected gateway $400_2$ (operation D 540).

Upon receipt of the encrypted message 505, the selected gateway $400_2$ re-routes the encrypted message 505 to the second ECMP-controlled switch 430, which forwards the encrypted message 505 to the router 440 (operation E 550 & operation F 560). The router 440 encapsulates the encrypted message 505 for transmission through a high-speed direct connection to the transit VPC 130 and directed to one of the transit gateways $210_1$-$210_N$ to subsequent transmission to a targeted cloud application, accessible via a spoke gateway within one of the spoke VPCs, such as spoke gateway $200_1$ deployed in the spoke VPC 120 (operation G 570).

Figure 6:
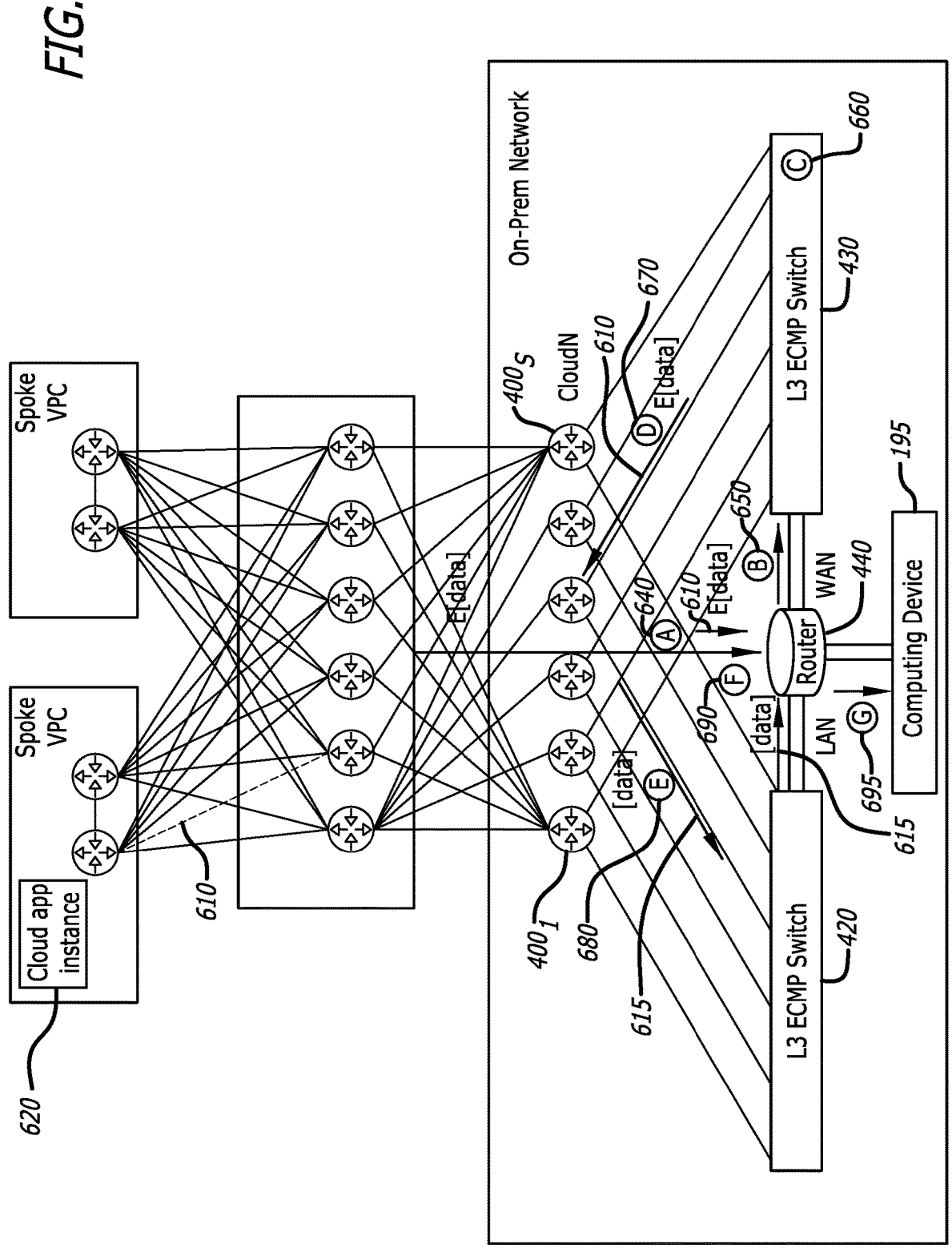
FIG. 6 is an exemplary embodiment of ingress operability of on-premises interface logic of FIG. 4.

Referring now to FIG. 6, an exemplary embodiment of ingress operability of on-premises interface logic of FIG. 4 is shown. As shown, the interface logic 180 features the gateway cluster 182 along with the first ECMP-controlled switch 420 and the second ECMP-controlled switch 430 operating with the router 440.

Herein, ingress communications 600, such as a message 610 from a cloud application instance 620 communicatively coupled to the gateway $210_1$ of the spoke VPC 120, is received by the router 440 via the transit gateway cluster 132 (operation A 640). Herein, the message 610 may be encrypted as represented in FIG. 6 as "E [data]". In response, the router 440 forwards the E [data] 610 to the second ECMP-controlled switch 430 (operation B 650). The second ECMP-controlled switch 430 performs ECMP-based computations on the metrics associated with each the gateways $400_1$-$400_S$ within the gateway cluster to select one of the gateways $400_1$ . . . or $400_S$ (e.g., gateway $400_4$). Also, the second ECMP-controlled switch 430 decrypts the E [data] 610 to generate a plaintext message 615 as represented in FIG. 6 as "data" 615, which is provided to the selected gateway $400_4$ (operation C 660). Thereafter, the first ECMP-controlled switch 420 forwards the data 615 to the selected gateway $400_4$ (operation D 670).

Upon receipt of the data 615, the selected gateway $400_4$ re-routes the data 615 to the first ECMP-controlled switch 420, which forwards the data 615 to the router 440 (operation E 680 & operation F 690). The router 440 encapsulates the content of the data 615 for transmission a targeted computing device within the on-prem network 190, such as computing device 195 (operation G 695).

Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:

1. A scalable network for routing information between a source and a destination, the scalable network comprising:
   a first transit gateway cluster including at least two pairs of transit gateways, each transit gateway of the first transit gateway cluster comprising a processor configured to control routing of one or more messages received via at least a first communication link through a first plurality of communication links;
   a first pair of spoke gateways, each spoke gateway of the first pair of spoke gateways comprising a gateway routing table configured to determine which peer to peer communication link of a plurality of peer to peer communication links to use when forwarding a message from a cloud application instance assigned to the spoke gateway to a first destination instance;
   a second transit gateway cluster including at least two pairs of transit gateways, each transit gateway of the second transit gateway cluster comprising a processor configured to control routing of the one or more messages received from each of the first plurality of communication links to a second plurality of communication links for subsequent routing to the destination; and
   a second pair of spoke gateways, each spoke gateway of the second pair of spoke gateways comprising a gateway routing table configured to determine which peer to peer communication link of a plurality of peer to peer communication links to use when forwarding a message from a cloud application instance assigned to the spoke gateway to a second destination instance,
   wherein, in response to a failure of a peer to peer communication link of the plurality of peer to peer communication links of the first pair of spoke gateways, a spoke gateway of the first pair of spoke gateways that relies on the failed peer to peer communication link updates the gateway routing table autonomously by disabling a tunnel interface corresponding to the failed peer to peer communication link without reliance on activity by a controller that manages operability of the scalable network.

2. The scalable network of claim 1, wherein each of the first plurality of communication links and each of the second plurality of communication links constitutes a cryptographically secure tunnel.

3. The scalable network of claim 1, wherein the first communication link is terminated at a first end by at least a first transit gateway of the at least two pair of transit gateways forming the first transit gateway cluster and terminated at a second end by a spoke gateway, the spoke gateway is configured to support routing of the one or more messages from a cloud instance operating as the source.

4. The scalable network of claim 1, wherein each transit gateway of the first transit gateway cluster being communicatively coupled to each transit gateway of the second transit gateway cluster via the first plurality of communication links to support increased scalability for spoke virtual private cloud networks communicatively coupled to the first transit gateway cluster.

5. The scalable network of claim 1 further comprising a third transit gateway cluster including at least two pairs of transit gateways, wherein the first transit gateway cluster is communicatively coupled to a first set of spoke gateways associated with a first virtual private cloud network, the third transit gateway cluster is communicatively coupled to a second set of spoke gateways associated with a second virtual private cloud network, and the second transit gateway cluster being communicatively coupled to the at least two pairs of transit gateways deployed within the first transit gateway cluster and the at least two pairs of transit gateways deployed within the third transit gateway cluster.

6. The scalable network of claim 5, wherein first virtual private cloud network is deployed within a first public cloud network and the second virtual private cloud network is deployed within a second public cloud network being different than the first public cloud network.

7. The scalable network of claim 1 further comprising: a gateway cluster including a plurality of gateways communicatively coupled to the at least two pairs of transit gateways; and switching logic to control selection of one or more gateways of the plurality of gateways forming the gateway cluster for handling ingress egress traffic into or egress data traffic from an on-premises network to the second transit gateway cluster.

8. The scalable network of claim 7, wherein the switching logic comprises a first logical switch to perform selection of a gateway of the plurality of gateways forming the gateway cluster for supporting the egress data traffic and a second logical switch to perform selection of a gateway of the plurality of gateways forming the gateway cluster for supporting the ingress data traffic.

9. The scalable network of claim 8, wherein first logical switch and the second logical switch operate in accordance with an Equal-Cost Multi-Path (ECMP) switching scheme.

\* \* \* \* \*